(12) United States Patent
Ellingham

(10) Patent No.: US 12,315,645 B2
(45) Date of Patent: May 27, 2025

(54) CONTAINMENT SYSTEM

(71) Applicant: Rolls-Royce SMR Limited, Derby (GB)

(72) Inventor: Philip Ellingham, Derby (GB)

(73) Assignee: Rolls-Royce SMR Limited, Derby (GB)

( * ) Notice: Subject to any disclaimer, the term of this patent is extended or adjusted under 35 U.S.C. 154(b) by 278 days.

(21) Appl. No.: 17/781,299

(22) PCT Filed: Nov. 10, 2020

(86) PCT No.: PCT/EP2020/081602
§ 371 (c)(1),
(2) Date: May 31, 2022

(87) PCT Pub. No.: WO2021/110373
PCT Pub. Date: Jun. 10, 2021

(65) Prior Publication Data
US 2022/0415528 A1     Dec. 29, 2022

(30) Foreign Application Priority Data
Dec. 6, 2019  (GB) ..................................... 1917905

(51) Int. Cl.
*G21C 13/028*    (2006.01)
(52) U.S. Cl.
CPC ................. *G21C 13/0285* (2013.01)
(58) Field of Classification Search
CPC ...... B65D 90/58; B65D 90/62; B65D 90/626; E06B 3/4423; E06B 11/025; E06B 11/12;
(Continued)

(56) References Cited

U.S. PATENT DOCUMENTS 2,614,835 A * 10/1952 Margison ................ E05F 15/57
                                                      160/32
2003/0156676 A1    8/2003 Colditz et al.
2012/0027153 A1    2/2012 Sugiura et al.

FOREIGN PATENT DOCUMENTS

| JP | H08189985 A | 7/1996 |
| JP | 2013117491 A | 6/2013 |
| JP | 2013195342 A * | 9/2013 |

OTHER PUBLICATIONS

Shackelford, M. H., T. R. Bump, and R. W. Seidensticker. Characterization of nuclear reactor containment penetrations. Final report . No. NUREG/CR-3855; SAND-84-7139; ANL-84-87. Argonne National Lab.(ANL), Argonne, IL (United States), 1985. (Year: 1985).*

(Continued)

*Primary Examiner* — Jack W Keith
*Assistant Examiner* — Jinney Kil
(74) *Attorney, Agent, or Firm* — Quarles & Brady LLP

(57) ABSTRACT

There is disclosed a containment system for a nuclear plant, the containment system comprising a pressure vessel defining a containment space for containing nuclear plant structures, a working floor extending from within the containment space to outside the pressure vessel, an access opening in the pressure vessel for providing access from the working floor outside the pressure vessel to the working floor in the containment space, and an access door provided within the pressure vessel. The access door is configured to slidably move downwardly with respect to the pressure vessel from a closed position in which it closes the access opening to seal the pressure vessel, and an open position in which it reveals the access opening and is received in a door space in the working floor. The access door comprises a first integral floor plug which is configured to plug the door space in the working floor when the access door is in the open position, (Continued)

to provide a substantially continuous working floor surface from outside the pressure vessel to within the containment space.

10 Claims, 5 Drawing Sheets

(58) Field of Classification Search
CPC ...... F17J 13/22; G21C 13/0285; G21C 13/06; G21C 13/063; G21C 13/073; G21C 13/0735
USPC ....... 376/203, 294; 220/252, 582; 49/33, 54, 49/131, 158, 372, 374
See application file for complete search history.

(56) References Cited

OTHER PUBLICATIONS

International Search Report and Written Opinion, International Application No. PCT/EP2020/081602, European Patent Office, dated Jan. 25, 2021, 8 pages.
UKIPO Search and Examination Report, Application No. GB1917905.0, dated May 1, 2020, 5 pages.
Chinese Office Action and Search Report, CN Application No. 202080084087.9, issued by CNIPA Office, mailed May 16, 2024, 5 pages. English Translation also provided.

* cited by examiner

CONTAINMENT SYSTEM

RELATED APPLICATIONS

This application is a 35 U.S.C. § 371 national phase application of PCT/EP2020/081602 (WO-2021/110373-A1), filed on Nov. 10, 2020, entitled "A CONTAINMENT SYSTEM" which application claims the benefit of GB-1917905.0 filed Dec. 6, 2019, both of which are incorporated herein by reference in its entirety.

FIELD OF THE DISCLOSURE

The present invention relates to a containment system for a nuclear plant and a method of providing access to the containment system.

BACKGROUND

Containment systems for a nuclear plant typically comprise a pressure vessel with an opening for moving equipment into and out of the pressure vessel. Providing access can be difficult due to the size of the opening required and the space requirement in the pressure vessel for moving a door.

SUMMARY

According to a first aspect, there is provided a containment system for a nuclear plant, the containment system comprising: a pressure vessel defining a containment space for containing nuclear plant structures; a working floor extending from within the containment space to outside the pressure vessel; an access opening in the pressure vessel for providing access from the working floor outside the pressure vessel to the working floor in the containment space; and an access door provided within the pressure vessel and configured to slidably move downwardly from a closed position in which it closes the access opening to seal the pressure vessel, and an open position in which it reveals the access opening and is received in a door space in the working floor; wherein the access door comprises a first integral floor plug which is configured to plug the door space in the working floor when the access door is in the open position, to provide a substantially continuous working floor surface from outside the pressure vessel to within the containment space.

The first integral floor plug is attached to the top of the access door.

The first integral floor plug moves with the access door such that, without rotating, it plugs the door space in the working floor when the access door is moved to the open position. That is to say, the floor plug moves vertically downwards with the door, while remaining in the same orientation with respect to the door, and comes to rest in the door space when the door is fully open, such that it plugs the door space and forms a continuous working floor.

The working floor may be suspended within the containment space.

The door space in the working floor may comprise a recess for receiving the first integral floor plug when the access door is in the open position. The recess may define a shoulder to seat the first integral floor plug to transfer downward forces from the door plug to the working floor.

The access door may comprise a second integral floor plug on an opposing side of the access door to the first integral floor plug. The second integral floor plug may be configured to plug the door space in the working floor when the access door is in the closed position, to provide a substantially continuous working floor surface within the containment space.

The second integral floor plug may have a smaller width and/or depth than the first integral floor plug such that the second integral floor plug may be configured to pass through an opening in the door space adjacent to the shoulder.

The containment system may comprise a screw jack which is configured to move the access door with respect to the pressure vessel between the closed position and the open position.

The pressure vessel may comprise a frame, wherein the access door may be mounted to frame and the frame may be configured to move with respect to the pressure vessel to move the access door between the open position and the closed position.

The access door may be mounted to the frame such that the access door is moveable relative to the frame along an axis extending into the containment space. For example, the axis extending into the containment space may be parallel to the working floor.

The access door may comprise a sub-door for providing a smaller opening than the access opening to the containment space to provide faster access to the containment space.

According to a second aspect, there is provided method of providing access to a containment system according to the first aspect, the method comprising slidably moving the access door downwardly into the door space from a closed position in which it closes the access opening to seal the pressure vessel, and an open position in which it reveals the access opening.

The method may comprise moving the access door along an axis extending into the containment space from the closed position to an intermediate position, before moving the access door to the open position.

BRIEF DESCRIPTION OF THE DRAWINGS

Embodiments of the invention will now be described, by way of example only, with reference to the accompanying Figures, in which.

DETAILED DESCRIPTION

Figure 1:
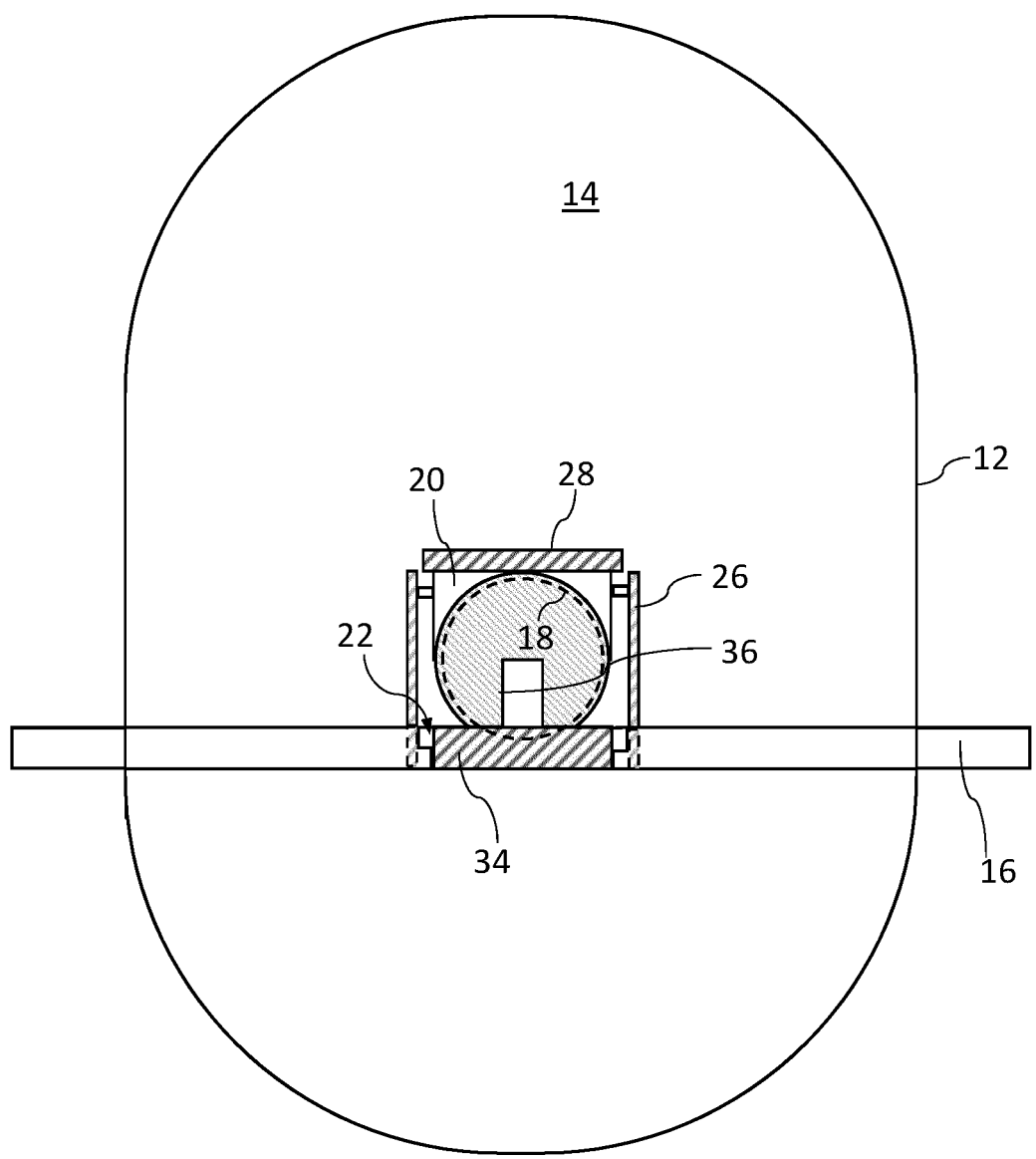
FIGS. 1 and 2 schematically show front cross-sectional views of an example containment system in a closed configuration and an open configuration respectively.
Figure 2:
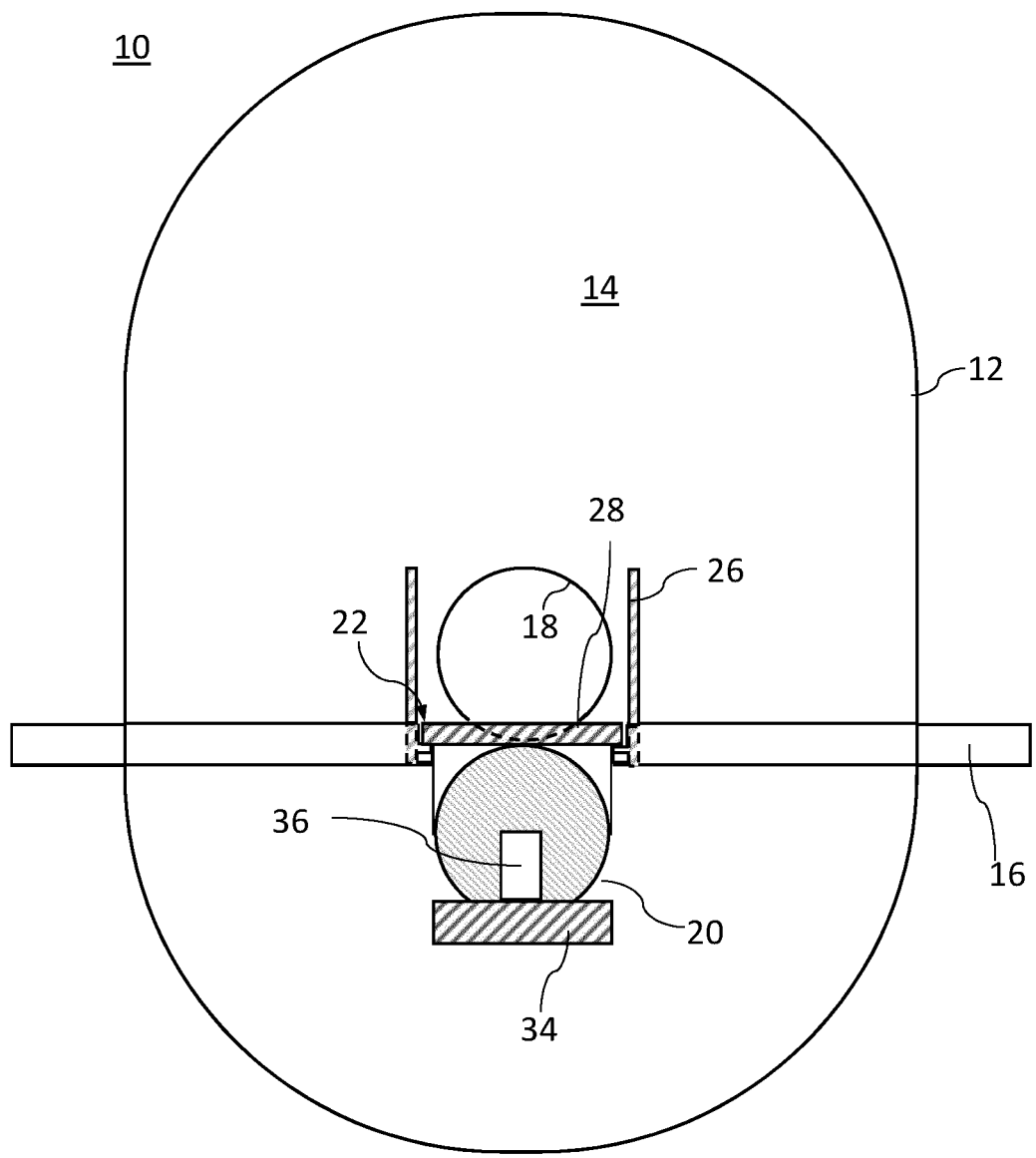

FIGS. 1 and 2 show a front cross-sectional view of a first example containment system 10 for a nuclear plant. The containment system 10 comprises a pressure vessel 12 which defines a containment space 14 therein for containing nuclear plant structures. In this example, the pressure vessel 12 is in the form of a cylinder with ellipsoidal ends at opposing ends of the cylinder. In other examples, the pressure vessel may be any suitable shape.

The containment system 10 comprises a working floor 16 which extends throughout the containment space 14 of the pressure vessel 12, and further extends to outside the pressure vessel 12. The working floor 16 is supported from a structure below the working floor 16 to be suspended within the containment space 14. The working floor 16 is configured to provide a surface to walk on and move equipment over.

The pressure vessel 12 comprises an access opening 18 (shown as dotted lines in FIG. 1) above the working floor 16 for providing access to the containment space 14 from outside the pressure vessel 12. In other words, the access opening 18 provides access from the working floor 16 outside the pressure vessel 12 to the working floor 16 within the containment space 14 (i.e. inside the pressure vessel 12).

In this example, the access opening 18 is circular, with the working floor 16 defining a chord across the circular access opening 18. The access opening 18 in this example has a diameter of 6 m. In other examples, the access opening may be any suitable size.

The containment system 10 further comprises an access door 20 which is provided within the pressure vessel 12. The access door 20 is configured to move slidably downwardly from a closed position to an open position. In embodiments, the access door 20 is configured to move slidably between the closed position and the open position along an axis perpendicular to the working floor 16.

FIG. 1 shows the containment system 10 in a closed configuration. In the closed configuration, the access door 20 is in the closed position in which the access door 20 closes the access opening 18 to seal the pressure vessel 12. The access door 20 has a generally circular shape which extends to a rectangular top comprising a first integral floor plug 28, disposed at the top of the access door 20. The circular portion of the access door has a diameter of approximately 6.5 m, such that it has a larger width and height than the access opening 18. The access door 20 overlaps with the pressure vessel 12 when in the closed position to be able to provide a seal between the access door 20 and the pressure vessel 12. In an example, there may be a planar, circular door frame attached to the pressure vessel to accommodate for the curvature of the pressure vessel. The access door may seal to the planar door frame in such an example.

In other examples, the access door may have any suitable shape, where the periphery of the access door overlaps the pressure vessel around the access opening when the access door is in the closed position, to seal the pressure vessel.

The access door 20 is provided inside the pressure vessel 12 as it must be able to withstand high pressure from within the containment space 14, and thus the high pressure forces the access door 20 against the pressure vessel 12 when in the closed position.

FIG. 2 shows the containment system 10 in the open configuration. In the open configuration, access door 20 is in the open position in which the access door 20 reveals the access opening 18 to provide access to the containment space 14 from outside the pressure vessel 12.

The access door 20 in this example is moveable relative to the pressure vessel 12 between the closed position and the open position. The access door 20 is mounted to a pair of screw jacks 26 on either side of the access door 20. The screw jacks 26 are fastened in and extend above the working floor 16 within the pressure vessel 12 such that the access door 20 can be slidably moved between the closed position and the open position by rotating the screw jacks 26.

In other examples, the access door may be moved between the closed position and the open position by any suitable means, such as with hydraulic cylinders.

The working floor 16 comprises a door space 22 which is configured to receive the access door 20 in the open position. When moving between the closed position and the open position, the access door 20 is configured to slide through the door space 22.

The first integral floor plug 28 is configured to plug the door space 22 in the working floor 16 when the access door 20 is in the open position (as shown in FIG. 2). This provides a substantially continuous working floor 16 surface from outside the pressure vessel 12 to within the containment space 14.

Having an access door 20 comprising a first integral floor plug 28 as described enables the door space 22 to be plugged at the same time as moving the access door 20 from the closed position to the open position, in one operation without requiring additional equipment or labour. Further, it enables the first integral floor plug 28 to be removed at the same time as moving the access door 20 from the open position to the closed position, in one operation without requiring additional equipment or labour. Having the access door 20 move downwardly into the working floor 16 from the closed position to the open position enables the use of the first integral floor plug 28 to plug the door space 22 in the open position.

An upper surface of the first integral floor plug may be provided with integral rails. The integral rails may be configured to align with rails on the working floor inside and outside the pressure vessel, so as to provide a substantially continuous rail from outside the pressure vessel to within the containment space. The rail may be arranged to transport equipment into and out of the pressure vessel.

The access door 20 further comprises a second integral floor plug 34 at the bottom of access door 20, on an opposing side of the access door 20 to the first integral floor plug 28. The second integral floor plug 34 is configured to plug the door space 22 when the access door 20 is in the closed position to provide a substantially continuous working floor 16 surface within the containment space 14. This removes the need to provide safety handrails around the door space 22 which would have to be removed to provide access to the containment space 14. In some examples, there may be no second integral floor plug.

The access door 20 further comprises a sub-door 36 for providing a smaller opening than the access opening 18 to the containment space 14, for providing faster access to the containment space 14 during an outage (i.e. when the nuclear plant is shut down). Doors providing access for people to a containment system typically comprise air locks. However, use of an air lock is not necessary when there is an outage. Therefore, providing a sub-door 36 in the access door 20 enables quicker access to the containment space 14 from outside the pressure vessel 12 without requiring more openings in the pressure vessel 12.

Figure 3:
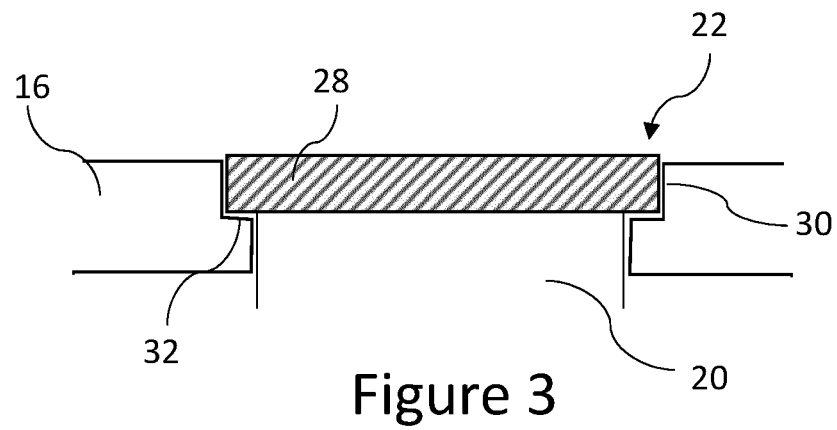
FIGS. 3 and 4 schematically show a close up view of a door space in a working floor of the example containment system of FIGS. 1 and 2 in an open configuration and a closed configuration respectively.

FIG. 3 shows a close up front view of the door space 22 in the working floor 16 with the access door 20 in the open position.

The door space 22 in the working floor 16 comprises a recess 30 for receiving the first integral floor plug 28 when the access door 20 is in the open position. The recess 30 defines a shoulder 32 to seat the first integral floor plug 28 in the recess 30. The first integral floor plug 28 rests on the shoulder 32 in the door space 22 thereby transferring downward forces from the first integral floor plug 28 to the working floor 16. In this example, the recess 30 is formed on opposing sides of the door space 22 (on either side of an axis extending into the containment space 14), thereby defining a shoulder on opposing sides of the door space 22. In other examples, the recess may be formed around the perimeter of the door space, defining a shoulder around the perimeter of the door space. In further examples, a plurality of recesses may be formed in any suitable positions around the door space, for example to define teeth and a plurality of corresponding shoulders.

Figure 4:
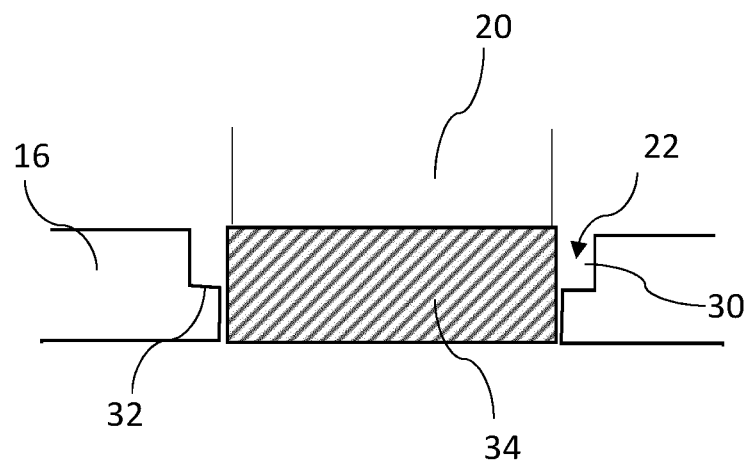

FIG. 4 shows a close up front view of the door space 22 in the working floor 16 with the access door 20 in the closed position.

In this example, the second integral floor plug 34 has a smaller width (along an axis across the access opening 18) and depth (along an axis into the containment space 14) than the first integral floor plug 28 such that the second integral floor plug 34 is configured to pass through an opening in the door space 22 adjacent to the shoulder 32. The second integral floor plug 34 is therefore received in the door space 22 within the shoulder 32 of the recess 30.

The second integral floor plug 34 extends from the working floor 16 surface to below the shoulder 32 of the recess 30 to plug the door space 22. When the access door 20 is in the closed position, there are small gaps in the recess 30 between the second integral floor plug 34 and the working floor 16 within the containment space 14 and outside the pressure vessel 12. This gaps are located within the containment space 14, and are small enough that the working floor 16 surface is substantially continuous within the pressure vessel 12 (i.e. in the containment space 14). In this example, the shoulders 32 extend to approximately 100 mm from the edge of the door space 22, such that with a clearance of approximately 10 mm between the second integral floor plug 34 and the shoulders 32, the gaps between the second integral floor plug 34 and the working floor 16 is approximately 110 mm. These gaps may be filled with smaller plugs which may be placed in the gaps manually or may automatically extend from the floor or from the second integral floor plug. In other examples, the shoulders may extend any suitable distance from the edge of the door space, and the clearance between the shoulders and the second integral floor plug may be any suitable amount.

In some examples, there is no recess in the door space such that the access door transfers downward forces to the working floor through the screw jacks in the open position, or by any other suitable means. In such examples, there would be a negligible gap between the second integral floor plug and the working floor 16.

Figure 5:
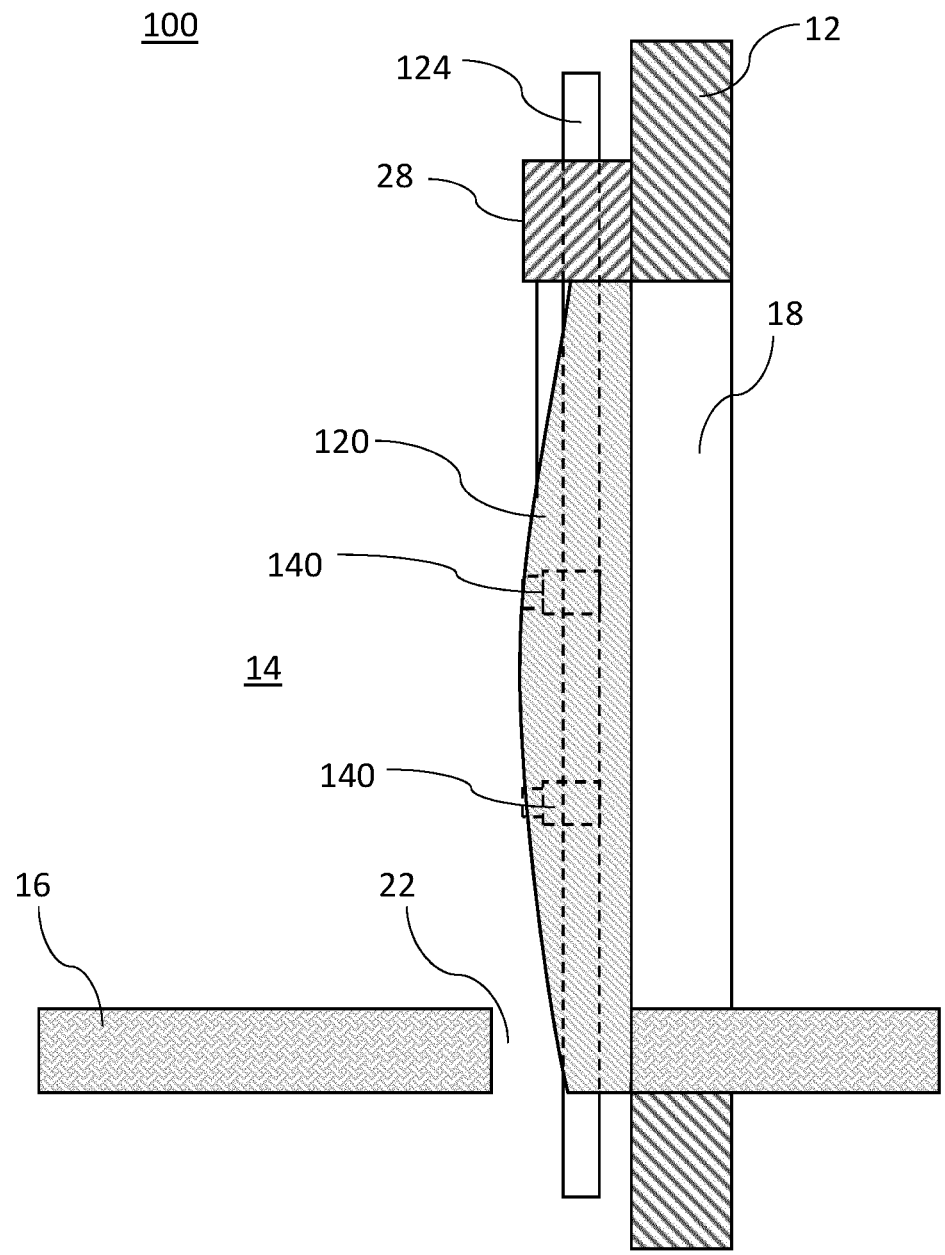
FIGS. 5 and 6 schematically show a side cross-sectional view of a second example containment system in a closed configuration and an intermediate configuration respectively.
Figure 6:
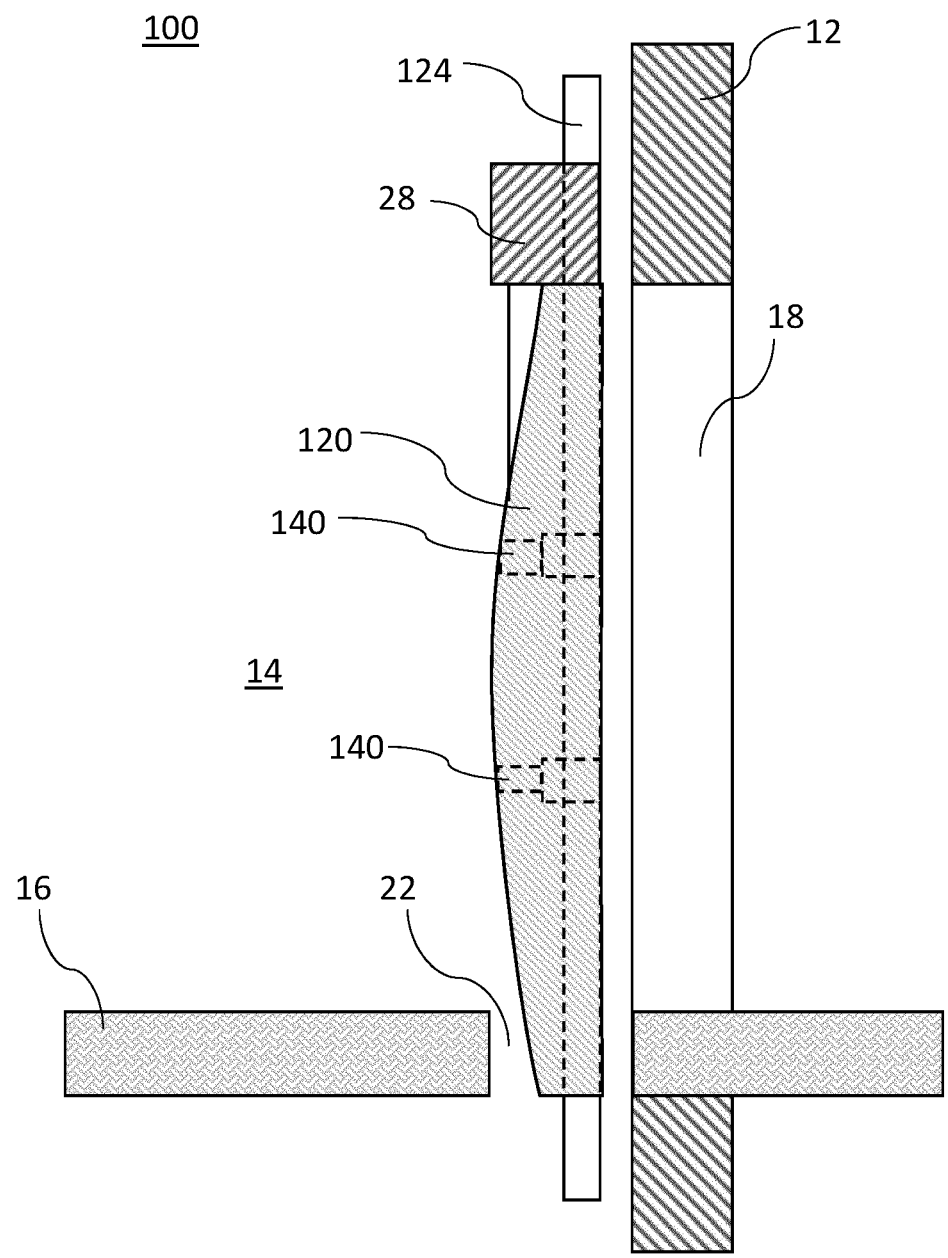

FIGS. 5 and 6 show a side cross-sectional view of a portion of a second example of a containment system 100.

In this example, the containment system 100 comprises a pressure vessel 12 having an access opening 18, and a working floor 16 which are similar to the pressure vessel 12, access opening 18 and working floor 16 of the first example containment system 10. The cross-sectional view shows one wall of the pressure vessel 12, and the working floor 16 on either side of the pressure vessel 12 wall.

The containment system 100 comprises an access door 120 similar to the access door 20 which is configured to close the access opening 18 of the pressure vessel 12. The access door 120 in this example comprises a first integral floor plug 28, which is similar to the first integral floor plug 28 of the first example. The access door 120 is configured to close the access opening 18 of the pressure vessel 12, and differs from the access door 20 in the first example containment system 10 in that it does not have a second integral floor plug 34. In some examples, the access door 120 may comprise a second integral floor plug as described with reference to the first example containment system 10.

The door space 22 in the working floor 16 is configured to receive the access door 120 in the same manner as described with reference to the first example containment system 10.

The access door 120 in this example is mounted to a frame 124. The frame 124 is mounted to a pair of screw jacks (not shown) in a similar manner to the access door 20 being mounted to the screw jacks 26 in the first example, so that the frame 124 is slidably moveable with respect to pressure vessel 12.

In this example, the access door 120 is mounted to the frame 124 by a series of extendible rods 140, such as hydraulic jacks, which are configured to move the access door 120 along an axis extending into the containment space 14. For example, the axis extending into the containment space 14 may be parallel to the working floor 16.

In other examples, the access door may be mounted to the frame in any suitable manner such that the access door is moveable relative to the frame along the axis extending into the containment space.

FIG. 5 shows the containment system 100 in a closed configuration in which the access door 120 is in a closed position. The access door 120 in the closed position closes the access opening 18 and seals against the pressure vessel 12. The extendible rods 140 are retracted to ensure that the access door 120 is sealed against the pressure vessel 12. In the closed position, the access door may be clamped to the pressure vessel to ensure that a tight seal is formed.

FIG. 6 shows the containment system 100 in an intermediate configuration in which the access door 120 is in an intermediate position which is moved away from the closed position along the axis extending into the containment space 14. The extendible rods 140 are extended into the containment space 14 to move the access door 120 away from the pressure vessel 12 wall along the axis extending into the containment space 14. The access door 120 can now be moved to an open position, in which it is received in the working floor 16 and exposes the access opening 18, without any friction between the access door 120 and the wall of the pressure vessel 12.

Such a mechanism to move the access door 120 to the intermediate position from the closed position, before moving it to the open position enables use of an additional sealing force to push the access door 120 against the pressure vessel 12 when in the closed position, whilst also ensuring the access door 120 can be moved between the open position and the closed position without damaging the pressure vessel 12 or access door 120 due to friction between them.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A containment system for a nuclear plant, the containment system comprising:
    a pressure vessel defining a containment space for containing nuclear plant structures;
    a working floor extending from within the containment space to outside the pressure vessel;

an access opening in the pressure vessel for providing access from the working floor outside the pressure vessel to the working floor in the containment space; and an access door provided within the pressure vessel and configured to slidably move downwardly with respect to the pressure vessel from a closed position in which the access door closes the access opening to seal the pressure vessel to an open position in which the access door reveals the access opening and is received in a door space in the working floor;

wherein the access door comprises a first integral floor plug which is configured to plug the door space in the working floor when the access door is in the open position, to provide a continuous working floor surface of the working floor from outside the pressure vessel to within the containment space;

wherein the pressure vessel comprises a frame, the access door being mounted to the frame and the frame being configured to move with respect to the pressure vessel to move the access door between the open position and the closed position; and wherein the access door is movable relative to the frame along an axis extending into the containment space, whereby the access door is sealed against the pressure vessel in the closed position and moved away from the pressure vessel to an intermediate position before being slid downwardly to the open position.

2. The containment system according to claim 1, wherein the first integral floor plug is attached to a top of the access door.

3. The containment system according to claim 2, wherein the first integral floor plug moves with the access door such that, without rotating the first integral floor plug relative to the access door, the first integral floor plug plugs the door space in the working floor when the access door is moved to the open position.

4. The containment system according to claim 1, wherein the door space in the working floor comprises a recess for receiving the first integral floor plug when the access door is in the open position, and wherein the recess defines a shoulder to seat the first integral floor plug to transfer downward forces from the first integral floor plug to the working floor.

5. The containment system according to claim 4, wherein the access door comprises a second integral floor plug on an opposing side of the access door to the first integral floor plug, wherein the second integral floor plug is configured to plug the door space in the working floor when the access door is in the closed position, to provide the continuous working floor surface of the working floor within the containment space.

6. The containment system according to claim 5, wherein the second integral floor plug has a smaller width and/or depth than the first integral floor plug such that the second integral floor plug is configured to pass through an opening adjacent to the shoulder into the door space.

7. The containment system according to claim 1, wherein the containment system comprises a screw jack which is configured to move the access door with respect to the pressure vessel between the closed position and the open position.

8. The containment system according to claim 1, wherein the access door comprises a sub-door for providing a smaller opening than the access opening to the containment space.

9. A method of providing access to a containment system according to claim 1, the method comprising slidably moving the access door downwardly into the door space from the closed position in which the access door closes the access opening to seal the pressure vessel, to the open position in which the access door reveals the access opening.

10. The method according to claim 9, comprising moving the access door along the axis extending into the containment space from the closed position to the intermediate position, before moving the access door to the open position.

* * * * *